United States Patent
Gaffney et al.

(10) Patent No.: US 7,837,743 B2
(45) Date of Patent: Nov. 23, 2010

(54) TANTALUM ANODES FOR HIGH VOLTAGE CAPACITORS EMPLOYED BY IMPLANTABLE MEDICAL DEVICES AND FABRICATION THEREOF

(75) Inventors: Kevin M. Gaffney, Dayton, MN (US); Kurt J. Casby, Grant, MN (US); Joachim Hossick-Schott, Minneapolis, MN (US); John D. Norton, New Brighton, MN (US); Angela M Rodgers, Minneapolis, MN (US); Karen J Hulting, Plymouth, MN (US)

(73) Assignee: Medtronic, Inc., Minneapolis, MN (US)

( * ) Notice: Subject to any disclaimer, the term of this patent is extended or adjusted under 35 U.S.C. 154(b) by 340 days.

(21) Appl. No.: 11/860,221

(22) Filed: Sep. 24, 2007

(65) Prior Publication Data

US 2009/0078344 A1    Mar. 26, 2009

(51) Int. Cl.
*H01G 9/04* (2006.01)
*H01G 9/145* (2006.01)

(52) U.S. Cl. .................. 29/25.03; 361/528
(58) Field of Classification Search ............... 361/528, 361/529, 524; 29/25.03
See application file for complete search history.

(56) References Cited

U.S. PATENT DOCUMENTS

| | | | |
|---|---|---|---|
| 3,466,230 A | 9/1969 | Carithers | |
| 4,544,403 A | 10/1985 | Schiele et al. | |
| 4,781,802 A | 11/1988 | Fresia | |
| 5,448,447 A | 9/1995 | Chang | |
| 5,455,736 A | 10/1995 | Nishiyama et al. | |
| 5,471,365 A | 11/1995 | Nakamura et al. | |
| 5,716,511 A * | 2/1998 | Melody et al. | 205/324 |
| 6,214,271 B1 | 4/2001 | Hahn | |
| 6,231,993 B1 | 5/2001 | Stephenson | |
| 6,238,456 B1 | 5/2001 | Wolf et al. | |
| 6,350,406 B1 | 2/2002 | Satou et al. | |
| 6,802,951 B2 | 10/2004 | Hossick-Schott | |
| 6,894,889 B2 | 5/2005 | Yano et al. | |
| 6,965,510 B1 | 11/2005 | Liu et al. | |
| 7,011,692 B2 | 3/2006 | Naito et al. | |

(Continued)

FOREIGN PATENT DOCUMENTS

EP    1592030 A1    11/2005

OTHER PUBLICATIONS

International Search Report, PCT/US2008/075753, May 2, 2009, 7 Pages.

(Continued)

*Primary Examiner*—Eric Thomas

(57) ABSTRACT

A high voltage capacitor anode for an implantable medical device is fabricated by sintering, anodizing and heat treating a pressed tantalum powder slug. The sintering may be performed at a temperature between approximately 1500° C. and approximately 1600° C. for a time between approximately 3 minutes and approximately 35 minutes; subsequent anodization may be performed by immersing the slug in an electrolyte at a temperature between approximately 15° C. and approximately 30° C. and then applying a voltage across the slug, the voltage being between approximately 175 Volts and approximately 375 Volts; subsequent heat treating may be performed at a temperature between approximately 400° C. and approximately 460° C. for a time between approximately 50 minutes and approximately 65 minutes. Following heat treating, the anode is reformed by a second anodization.

7 Claims, 4 Drawing Sheets

U.S. PATENT DOCUMENTS

2001/0007167 A1* 7/2001 Watanabe et al. .......... 29/25.03
2004/0134874 A1 7/2004 Hossick-Schott et al.
2006/0091020 A1 5/2006 Hossick-Schott et al.

OTHER PUBLICATIONS

Smyth D.M. et al., "Heat-Treatment of Anodic Oxide Films on Tantalum I. The Effects on Dielectric Properties", Journal of the Electrochemical Society, Manchester, New Hampshire, US, vol. 110, Dec. 1, 1963, pp. 1264-1271, XP009061557, ISSN: 0013-4651.

Smyth D.M. et al., "Heat-Treatment of Anodic Oxide Films on Tantalum II. Temperature Dependence of Capacitance", Journal of the Electrochemical Society, USA, vol. 10, No. 12, Dec. 1963, pp. 1271-1276, XP002511615.

German, Randall M., "Sintering Theory and Practice", p. 8, John Wiley & Sons, Inc., University Park, Pennsylvania.

J. Giber and H. Oechsner, "Dissolution of Anodic Ta2O5 Layers into Polycrystalline Tantalum", 1985, pp. 279-287, vol. 131, Elsevier Seuoia, The Netherlands.

T. Tripp, "The Effects of Thermal Treatment on the Dielectric Properties of Anodic Oxide Films on Tantalum and Niobium: A. Oxygen Migration", CARTS (23rd Capacitor and Resistor Technology Symposium), Mar. 31-Apr. 3, 2003, pp. 19-26.

Y. Pozdov-Freeman and A. Gladkikh, "The Effects of Thermal Treatment on the Dielectric Properties of Anodic Oxide Films on Tantalum and Niobium: B. Crystallization", CARTS (23rd Capacitor and Resistor Technology Symposium), Mar. 31-Apr. 3, 2003, pp. 29-36.

L. Djebara and T. P. Nguyen, "Some Investigations Concerning the Tantalum Oxide for Electrolytic Capacitors: Effect of Thermal Treatment", CARTS Europe (18th Annual Passive Components Conference), Oct. 18-21, 2004, pp. 121-125.

* cited by examiner

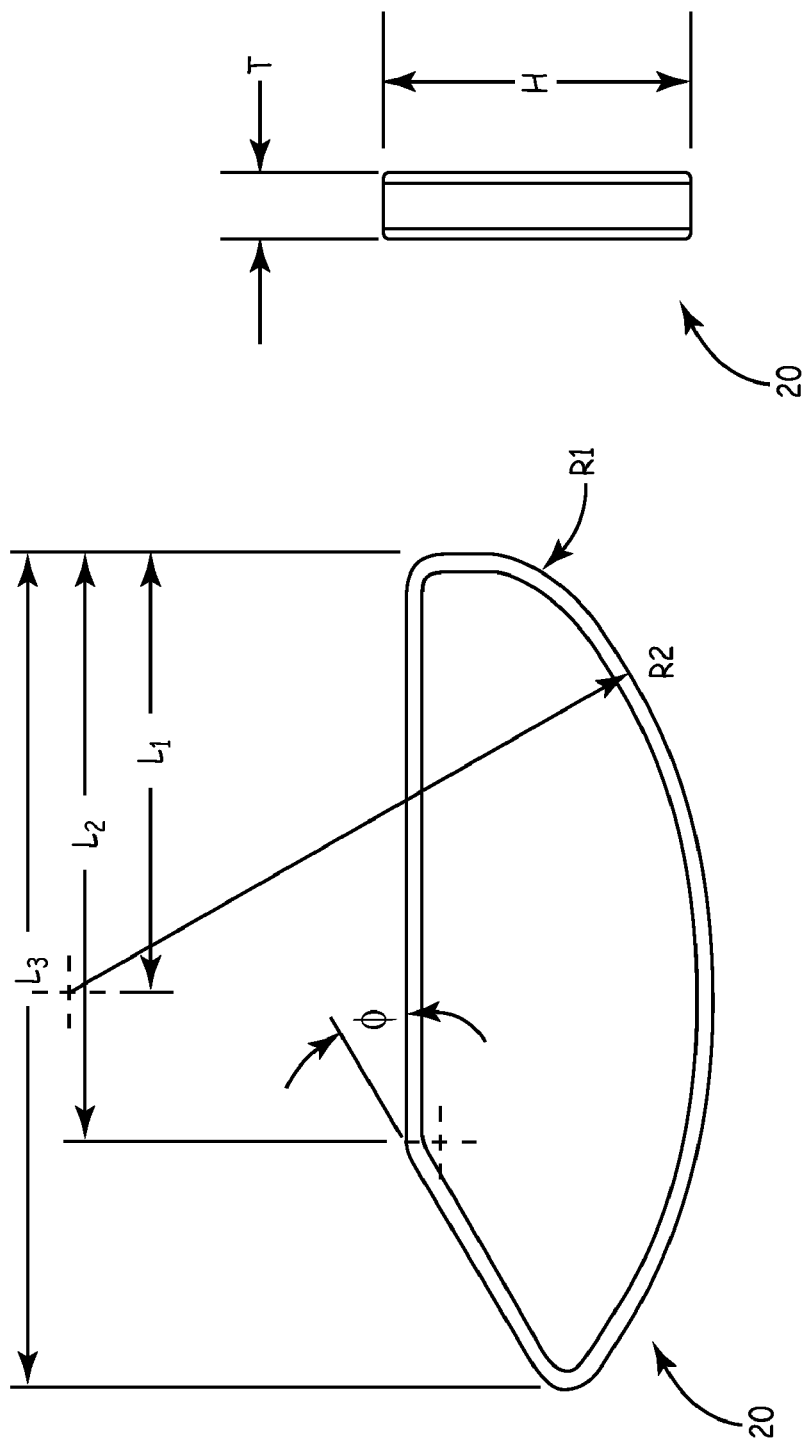

TANTALUM ANODES FOR HIGH VOLTAGE CAPACITORS EMPLOYED BY IMPLANTABLE MEDICAL DEVICES AND FABRICATION THEREOF

TECHNICAL FIELD

The present invention pertains to high voltage capacitors employed by implantable medical devices, and more particularly to tantalum anodes for these capacitors.

BACKGROUND

An implantable cardioverter defibrillator (ICD) is an example of one type of device which requires a high voltage capacitor in order to discharge an adequate amount of energy for defibrillation. Capacitors employed by these implantable devices must have a size, shape and mass that does not compromise the form factor of the device for implant, while having the capacity to deliver the required energy. One particular type of capacitor employed in these devices includes a tantalum anode and a graphite cathode, which are separated from one another by an electrically insulating porous material, for example, a fluoropolymer layer enclosing the anode.

Tantalum is one of a group of metals known as 'valve metals', which form adherent, dielectric, metal-oxide films upon anodic polarization in an electrolyte solution. Tantalum anodes are typically made from a tantalum powder, which may be pressed into a slug that has the appropriate form factor for a particular capacitor to fit within a particular device. The tantalum slug is subsequently sintered, in order to bond the particles of the powder together into a coherent and predominantly solid structure, and then formed, or anodized. The formed metal-oxide film (tantalum pentoxide) preferably extends over an entire surface area of the tantalum slug, which surface area preferably extends into all the cavities between the sintered particles of the slug. The character of the oxide film can greatly influence capacitor performance.

The thickness of the oxide film is approximately proportional to the potential applied across the slug during the formation process, and the potential applied to form the anode is typically greater than a maximum potential that would be applied during operation of the capacitor including the anode. An anode is said to be fully formed when the oxide film has reached a certain thickness and has a certain structure to effectively hold a charge, at the operating potential of the capacitor, for an appropriate amount of time, without allowing an excessive amount of charge to leak out. A charge efficiency of the capacitor can be greatly influenced by the capacity of the anode to hold a maximum amount of charge. Methods/processes have been developed to fabricate tantalum anodes that hold an adequate amount of charge, without excessive current leakage, in order to provide adequate capacitor efficiency. However, there is still a need for new processes/methods to fabricate tantalum anodes that have a capacity to hold more charge without exhibiting significant current leakage, so that an energy density of the anodes (deliverable energy per volume of the anode) is not compromised, and the creation of even more efficient capacitors for high voltage applications in implantable medical devices is facilitated.

BRIEF DESCRIPTION OF THE DRAWINGS

The following drawings are illustrative of particular embodiments of the present invention and therefore do not limit the scope of the invention. The drawings are not to scale (unless so stated) and are intended for use in conjunction with the explanations in the following detailed description. Embodiments of the present invention will hereinafter be described in conjunction with the appended drawings, wherein like numerals denote like elements.

FIGS. 2A-B are a plan view and side view, respectively of a tantalum slug, according to exemplary embodiments of the present invention.

DETAILED DESCRIPTION

The following detailed description is exemplary in nature and is not intended to limit the scope, applicability, or configuration of the invention in any way. Rather, the following description provides practical illustrations for implementing exemplary embodiments of the present invention. Examples of constructions, materials, dimensions, and manufacturing processes are provided for selected elements, and all other elements employ that which is known to those of skill in the field of the invention. Those skilled in the art will recognize that many of the examples provided have suitable alternatives that can be utilized.

Embodiments of the present invention include tantalum anodes fabricated for high voltage capacitors, for example, as employed by ICD's, which exhibit a current leakage, which is below that of anodes fabricated according to typical industry methods, and which exhibit an energy density, which is typical for those anodes.

Figure 1:
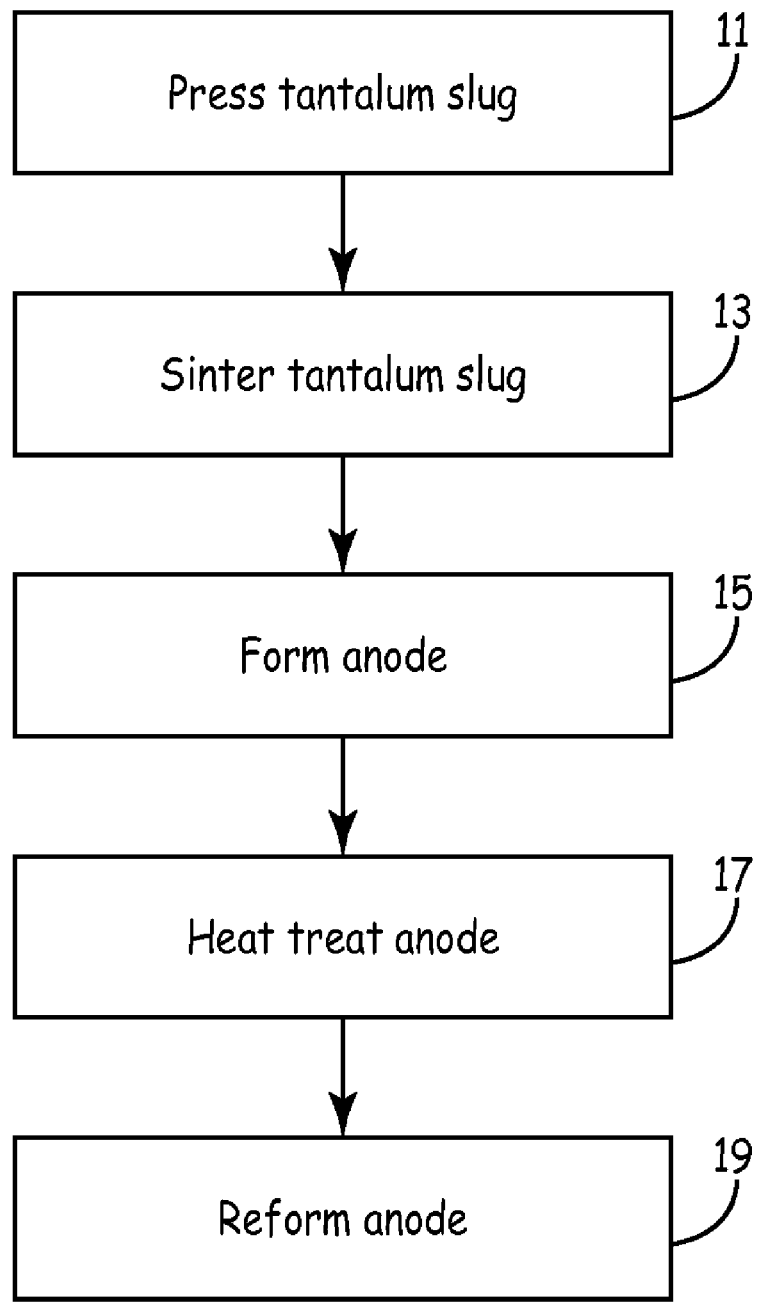
FIG. 1 is a flow chart outlining methods of the present invention.

FIG. 1 is a flow chart outlining methods of the present invention. According to an initial step 11, a quantity of tantalum powder, for example, of the type in the family of powders sold by HC Starck and identified as NH-175, is pressed, for example, with punch and die tooling known to those skilled in the art, into a slug having a particular volume and shape for a particular capacitor. A density of the pressed slug, determined by the quantity of powder particles and the desired volume of the pressed slug, is between approximately 5.5 grams/cubic centimeter (g/cc) and approximately 6.3 g/cc, according to exemplary embodiments of the present invention. Those skilled in the art understand that the pressed slug is porous and that it is desirable for the slug to have a fairly homogeneous distribution of pores. Prior to pressing, the powder particles may be blended with a binder and a lubricant and then dried according to methods known to those skilled in the art. Following pressing, the slug may be rinsed to remove any lubricant, which may have been blended in with the powder prior to pressing, and then dried.

FIGS. 2A-B are a plan view and side view, respectively of a pressed tantalum slug 20, according to exemplary embodiments of the present invention. FIGS. 2A-B illustrate slug 20 having a thickness T, a height H, a first edge having a first length L1, a second length L2, and a third length L3, and a second edge having a first radius R1 and second radius R2. FIG. 2A further illustrates the first edge having two relatively straight portions extending at an angle φ from one another. According to a first exemplary embodiment of the present invention, thickness T is approximately 0.125 inch, height H is approximately 0.60 inch, first length L1 is approximately 0.86 inch, second length L2 is approximately 1.15 inches, third length L3 is approximately 1.63 inches, angle φ is approximately 30°, first radius R1 is approximately 0.31 inch, second radius R2 is approximately 1.26 inches. A volume of anodes according to these dimensions is approximately 1.5 cubic centimeters, including pores.

Referring back to FIG. 1, after pressing, per step 11, the tantalum slug is sintered, per step 13. According to some embodiments of the present invention, the slug is sintered in a vacuum oven (approximately 2×10−5 torr or higher vacuum) at a temperature between approximately 1500° C. and approximately 1600° C., preferably approximately 1550° C., for a time between approximately 3 minutes and approximately 35 minutes, preferably approximately 10 minutes. Following sintering, a temperature of the oven may be lowered to approximately 40° C. and an inert gas, for example, Helium, injected into the oven at approximately atmospheric pressure. After removing the tantalum slug from the vacuum oven, the slug is formed into an anode, per step 15, by growing an oxide film, preferably, over an entire surface area of the slug, wherein the surface area extends into all the cavities between the sintered particles.

According to exemplary embodiments of the present invention, step 15 is accomplished by immersing the sintered slug into a liquid electrolyte and then applying a voltage across the slug. What is known as filling, may precede anode formation; filling may be accomplished by forcing the electrolyte into the pores of the slug via the application of one or more cycles of a vacuum, for example, less than or equal to approximately −26 inches Hg for approximately 30 seconds or longer. An exemplary liquid electrolyte suitable for forming the anode contains tetraethylene glycol dimethyl ether (tetraglyme), has a pH of 4.0+/−0.2, a conductivity ranging from approximately 400 to approximately 900 micro-Siemens (µS), and a Brix value of 36.3 to 41.8. According to an exemplary embodiment, in order to grow an oxide film having a thickness ranging from approximately 300 to approximately 600 nanometers, the slug is immersed in the electrolyte, which is initially at a temperature between approximately 15° C. and approximately 30° C., while a voltage across the slug ramps up to between approximately 175 Volts and approximately 375 Volts, over a time ranging from approximately 60 hours to approximately 100 hours, to drive a current, between approximately 40 milli-amps (mA) and approximately 150 mA and gradually decaying to between approximately 1 mA and approximately 3 mA, until the current stops decaying.

After forming (step 15), the anodized slug, or anode, is rinsed to remove electrolyte from the surfaces thereof, and then heat treated, per step 17, in order to move oxygen from the newly-formed oxide film into the underlying tantalum substrate in a controlled manner. Those skilled in the art understand that the resulting migration of oxygen into the underlying tantalum substrate causes a portion of the oxide film adjacent the underlying substrate to acquire a conductivity such that an effective thickness of the oxide layer, or dielectric, decreases to cause an increased capacitance. According to some embodiments of the present invention, the anode is heat treated at a temperature between approximately 400° C. and approximately 460° C., preferably approximately 450° C., for a time between approximately 45 minutes and approximately 65 minutes, preferably approximately 60 minutes. The heat treating may be performed in an uncontrolled air atmosphere, which atmosphere is preferred for process simplicity. It should be noted that previous studies have suggested that heat treating tantalum substrates, which have tantalum oxide films formed thereover, in an uncontrolled air environment, and at temperatures in the neighborhood of the aforementioned preferred temperatures, can lead to the formation of tantalum oxide crystals large enough to cause disruption of the anodic oxide film. The disruptions caused by these relatively large tantalum oxide crystals, if not addressed in subsequent process steps, could adversely impact anode performance, via increased current leakage, thus negating the benefit of increased capacitance.

Although heat treating, according to the above parameters, may cause the formation of relatively larger tantalum oxide crystalline inclusions having the capacity to enlarge any discontinuities left in the oxide film from forming (step 15), the enlarged discontinuities may be more susceptible to 'healing' during subsequent reforming, per step 19. Reforming, per step 19, heals discontinuities, without adding significant additional overall thickness to the oxide film. Filling, for example, according to the process described above for step 15, may precede the reforming at step 19, and the same liquid electrolyte described above for forming (step 15) may be used for the reforming at step 19. According to exemplary embodiments of the present invention, the slug is immersed in the electrolyte, which is initially at a temperature between approximately 20° C. and approximately 40° C., while a voltage is applied across the slug to drive a current until the current stops decaying (preferably, for a time of no more than approximately two hours); the voltage ramps up to a target value, for example, between approximately 175 and 375 Volts, over a time of approximately two minutes, in which time the current initially rises and then starts to decay when the target voltage is reached.

Ranges and preferred processing parameters for sintering (step 13) and heat treating (step 17), in combination with pressing (step 11), forming (step 15) and reforming (step 19), as described above, were established through a sequence of designed experiments. For an initial designed experiment, three groups, Group 1, Group 2 and Group 3, of tantalum anodes were fabricated from tantalum slugs, having dimensions similar to those defined above, in conjunction with FIGS. 2A-B, for the first exemplary embodiment. Each group was fabricated according to the corresponding process parameters defined in TABLE 1, below, and according to the exemplary parameters defined above, in conjunction with FIG. 1, for the other process steps.

TABLE 1

|  | Group 1 | Group 2 | Group 3 | Standard/baseline |
|---|---|---|---|---|
| Sinter Temperature (° C.) | 1450 | 1500 | 1550 | 1450 |
| Sinter Time (minutes) | 20 | 40 | 60 | 30 |
| Heat treat Temperature (° C.) | 350 | 400 | 450 | 350 |
| Heat treat Time (minutes) | 20 | 40 | 60 | 20 |

For reference, TABLE 1 also shows standard, or baseline parameters, which are known in the art to produce anodes of acceptable performance. With reference to TABLE 1, it may be appreciated that Group 2 and 3 values for sinter temperature, heat treating temperature, and heat treating time exceed that which are typically used for anode fabrication by those skilled in the art; for example, those indicated in the standard/baseline column of TABLE 1.

Following anode reform (step 19), electrical performance data, for example, leakage current, capacitance, equivalent series resistance, input energy, output efficiency and delivered energy, was collected for each slug of Groups 1, 2, and 3. An analysis of all the electrical performance data associated with the process parameters of TABLE 1 was performed using Design Expert™ software, and, according to the performance data, the software predicted regions of optimized electrical performance, within a space defined by the above process parameters, from which process parameters shown in TABLE 2, below, were selected.

TABLE 2

| Sinter Temperature (° C.) | 1520 |
| Sinter Time (minutes) | 20 |
| Heat treat Temperature (° C.) | 450 |
| Heat treat Time (minutes) | 60 |

The parameters shown in TABLE 2, along with those exemplary parameters for the other process steps, defined in conjunction with FIG. 1, above, were used to fabricate another group of anodes, Group A. Electrical performance was measured for capacitors including Group A anodes, and compared to that measured for capacitors including a Control Group of anodes, which were fabricated according to the baseline parameters defined for the process steps in TABLE 1 and aforementioned exemplary parameters defined for the other process steps. TABLE 3 presents electrical performance measurements of interest for Group A and the Control Group, each of which have been normalized by the corresponding measurements for the Control Group.

TABLE 3

| Electrical performance measures (Normalized) | Group A | Control Group |
|---|---|---|
| Deliverable Energy | 1.007 | 1.000 |
| Leakage Current | 0.473 | 1.000 |
| Output Efficiency | 1.038 | 1.000 |

With reference to TABLE 3, it may be appreciated that capacitors including Group A anodes exhibit less leakage current than those including Control Group anodes, and have a greater deliverable energy, resulting in increased output efficiency. Leakage current was measured while the capacitors were charged to the maximum rated voltage and held at that voltage for approximately five minutes. The deliverable energy was calculated by integrating a voltage multiplied by a current of a discharge waveform, the discharge waveform being generated by charging the capacitors to the maximum rated voltage and then discharging the capacitors into a 17 Ohm load. Output efficiency is a function of the deliverable energy, being a ratio of the deliverable energy to an input energy required to charge the capacitors to the maximum rated voltage.

A second designed experiment was conducted, in which the heat treat parameters from TABLE 2 were maintained in combination with a new range of sinter parameters centered around the 'optimized' sinter parameters from the previous designed experiment. Anodes fabricated for this second experiment were according to a second exemplary embodiment, which is similar in shape to those previously described in conjunction with FIGS. 2A-B, but larger, for example, having a volume of approximately 3 cubic centimeters, including pores. With reference back to FIGS. 2A-B relevant dimensions for this second exemplary embodiment are as follows: thickness T is approximately 0.120 inch, height H is approximately 1.071 inches; third length L3 is approximately 1.751 inches; angle φ is approximately 45°; and second radius R2 is approximately 0.902 inch. The new experimental sinter parameters are shown in TABLE 4. It should be understood that, in addition to maintaining the heat treat parameters from TABLE 2, the exemplary parameters described, in conjunction with FIG. 1, for the other process steps, were maintained as well.

TABLE 4

| | Min | Center | Max |
|---|---|---|---|
| Sinter Temperature (° C.) | 1407 | 1520 | 1633 |
| Sinter Time (minutes) | 6 | 20 | 34 |

As before, a Design Expert™ software analysis of electrical performance data for anodes fabricated according to each set of parameters, Min, Center and Max, predicted regions of optimized electrical performance, from which process parameters, shown in TABLE 5, were selected.

TABLE 5

| Sinter Temperature (° C.) | 1550 |
| Sinter Time (minutes) | 10 |
| Heat treat Temperature (° C.) | 450 |
| Heat treat Time (minutes) | 60 |

Comparing sinter temperature and time in TABLES 1, 2 and 5 it can be seen that, through the first and second designed experiments, the sinter temperature was raised and the sinter time reduced (temperature from 1450° C., and time from 30 minutes–Standard/baseline, TABLE 1).

A group of anodes, Group C, having the dimensions defined above for the second exemplary embodiment, were fabricated according to the parameters in TABLE 5 (and according to the previously described exemplary parameters for the other process steps). Electrical performance measurements for capacitors including Group C anodes were taken for comparison with those taken for capacitors including another group of anodes, Group D, and capacitors including a Second Control Group of anodes; Group D and Second Control Group anodes had dimensions similar to those of Group C anodes. Group D anodes were fabricated according to the previously 'optimized' parameters shown in TABLE 2 (and according to the previously described exemplary parameters for the other process steps); and Second Control Group anodes were fabricated according to the Standard/baseline parameters shown in TABLE 1 (and according to the previously described exemplary parameters for the other process steps). TABLE 6 presents deliverable energy and leakage current for Groups C and D and Second Control Group, each of which have been normalized by the corresponding measurements for the Second Control Group.

TABLE 6

| Electrical performance measures (Normalized) | Group C | Group D | Second Control Group |
|---|---|---|---|
| Deliverable Energy | 1.104 | 0.976 | 1.000 |
| Leakage Current | 0.345 | 0.157 | 1.000 |

With reference to TABLE 6, it may be appreciated that maintaining the same heat treating parameters, which were 'optimized' from the initial designed experiment, in conjunction with increasing the sinter temperature and decreasing the sinter time, for fabrication of Group C anodes, resulted in an increased deliverable energy. Although leakage current is not reduced for Group C, with respect to Group D, leakage current for Group C is still significantly less than that for the Second Control Group. It should also be noted that, on average, an output efficiency for capacitors including Group C anodes was found to be slightly greater.

Figure 3A:
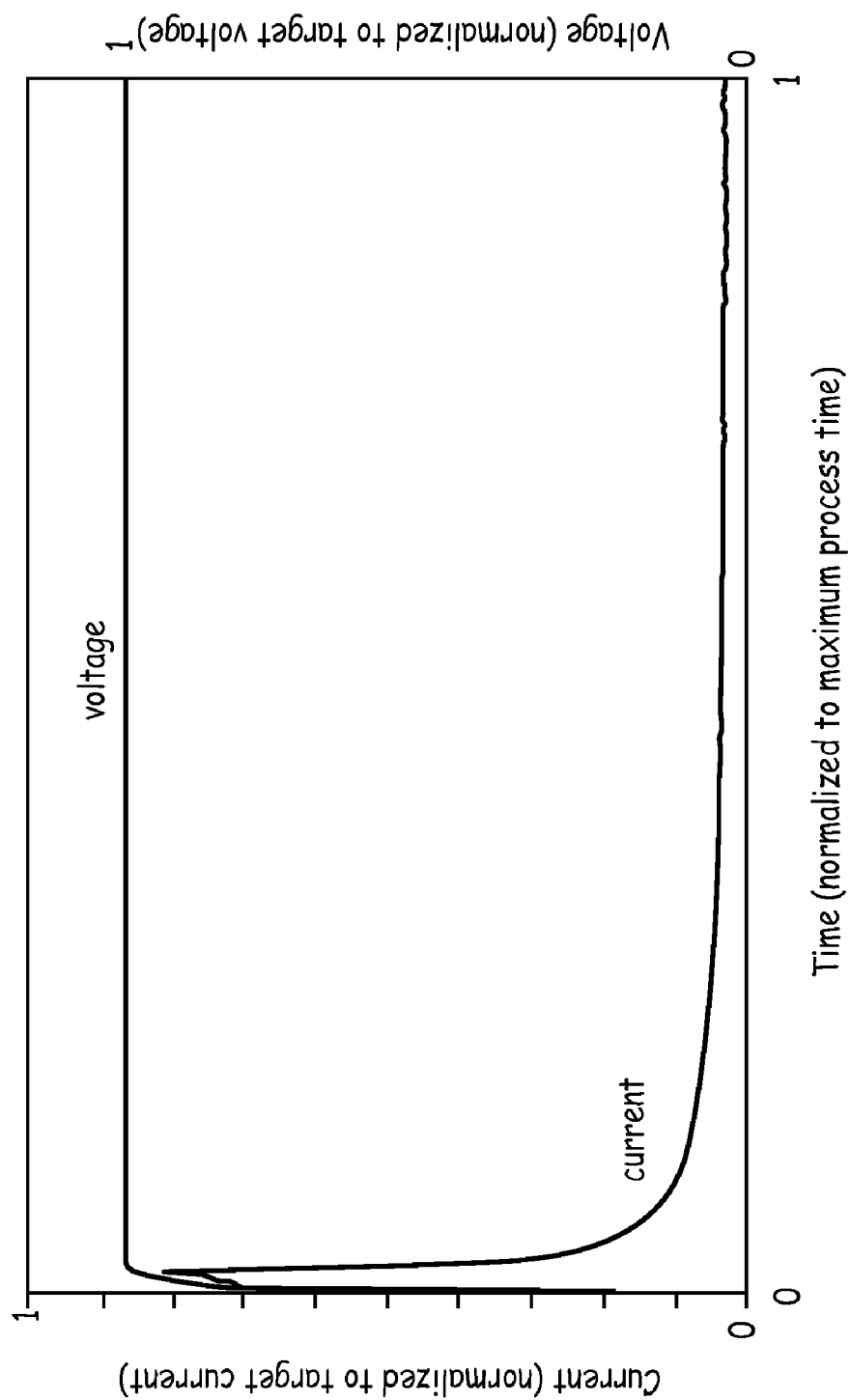
FIGS. 3A-B are plots of reform current and voltage for an anode fabricated according to methods of the present invention, and for an anode fabricated according to standard methods, respectively.
Figure 3B:
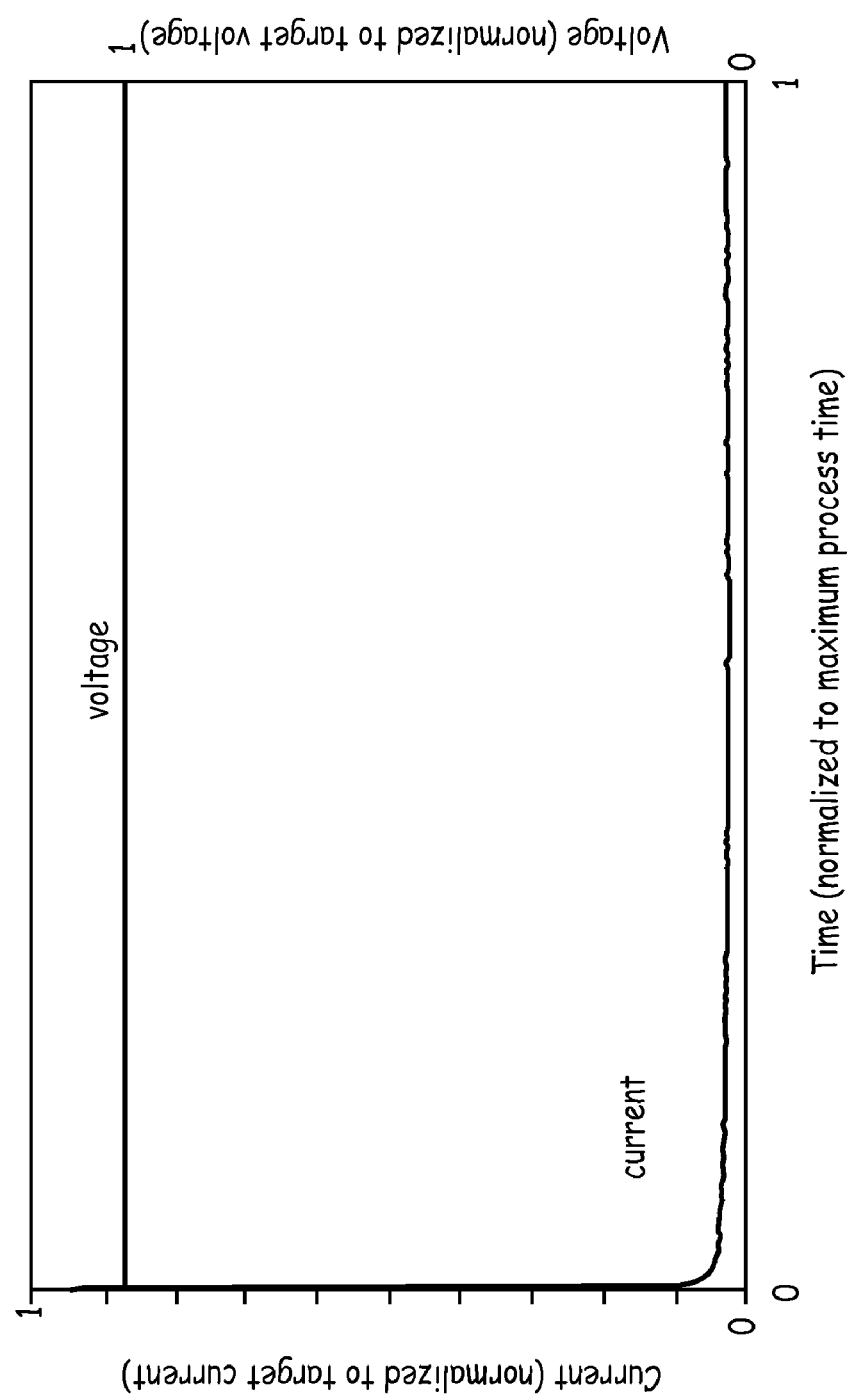

Turning now to FIG. 3A, a plot of normalized reform current and voltage versus time, which is representative of an anode having the dimensions defined for the first exemplary embodiment, and fabricated according to the parameters of TABLE 2, for example, from Group A, is shown; and FIG. 3B shows a similar plot, which is representative of an anode also having the dimensions defined for the first exemplary embodiment, and fabricated per the baseline parameters shown in TABLE 1, for example from the Control Group. FIGS. 3A-B illustrate a difference in the rate of voltage ramping and corresponding current decay at the start of reform for anodes from Group A (FIG. 3A) versus those from the Control Group (FIG. 3B). The slower ramping of voltage, on the order of two minutes, and corresponding delayed and then slower current decay for Group A indicates that the current is driving a reaction, which may be additional oxide growth. Those skilled in the art would consider a more rapid ramping to the maximum voltage, which is shown in FIG. 3B, more desirable, and, as evidence that additional oxide growth has not significantly added to the thickness of the originally formed oxide layer; yet performance measurements, presented herein (reference TABLE 3), provide evidence that electrical performance of capacitors including anodes from Group A, which meets or exceeds that of capacitors including anodes from the Control Group, has not been hindered by additional oxide growth. The lower leakage current for Group A may be evidence that the reform reaction is 'healing' discontinuities in the oxide layer, rather than growing the oxide layer. It should be noted that a similar voltage ramping rate and corresponding delay in current decay has been noted at the start of reform for the larger anodes from Group C.

In the foregoing detailed description, the invention has been described with reference to specific embodiments. However, it may be appreciated that various modifications and changes can be made without departing from the scope of the invention as set forth in the appended claims.

We claim:

1. A method for fabricating a tantalum anode for a high voltage capacitor for an implantable medical device, the method comprising:
    sintering a slug of pressed tantalum powder;
    anodizing the sintered slug to form the anode;
    heat treating the anode in an uncontrolled air atmosphere at a temperature between approximately 400° C. and approximately 460° C. for a time between approximately 45 minutes and approximately 65 minutes; and
    anodizing the heat treated anode to reform the anode by immersing the sintered slug in an electrolyte at a temperature between approximately 15° C. and approximately 30° C.; and
    applying a voltage across the immersed sintered slug, the voltage being between approximately 175 Volts and approximately 375 Volts.

2. The method of claim 1, wherein the heat treating temperature is approximately 450° C. and the heat treating time is approximately 60 minutes.

3. The method of claim 1, wherein the heat treating temperature is approximately 450° C.

4. The method of claim 1, wherein the heat treating time is approximately 60 minutes.

5. The method of claim 1, wherein the sintering is performed in a vacuum atmosphere at a temperature between approximately 1500° C. and approximately 1600° C. for a time between approximately 3 minutes and approximately 35 minutes.

6. The method of claim 5, wherein the sinter temperature is approximately 1520° C. and the sinter time is approximately 20 minutes.

7. The method of claim 5, wherein the sinter temperature is approximately 1550° C. and the sinter time is approximately 10 minutes.

* * * * *